United States Patent [19]

Huebner

[11] Patent Number: 4,957,577
[45] Date of Patent: Sep. 18, 1990

[54] METHOD FOR MAKING WELDED HONEYCOMB CORE

[75] Inventor: Fritz Huebner, Zeeland, Mich.

[73] Assignee: Plascore, Inc., Zeeland, Mich.

[21] Appl. No.: 177,437

[22] Filed: Apr. 4, 1988

[51] Int. Cl.⁵ .............................................. B32B 3/12
[52] U.S. Cl. ..................................... 156/197; 428/116
[58] Field of Search ............... 156/197, 292; 428/116, 428/117, 118

[56] References Cited

U.S. PATENT DOCUMENTS

| | | | |
|---|---|---|---|
| 2,428,979 | 10/1947 | May | 156/197 |
| 2,454,719 | 11/1948 | Scogland | 428/119 X |
| 2,553,054 | 5/1951 | Lincoln et al. | 156/197 |
| 2,576,864 | 11/1951 | Valente | 156/213 X |
| 2,608,502 | 8/1952 | Merriman | 428/198 |
| 2,610,934 | 9/1952 | Steele | 156/197 |
| 2,734,843 | 2/1956 | Steele | 156/197 |
| 2,959,257 | 11/1960 | Campbell | 428/116 |
| 2,999,306 | 9/1961 | Baxter | 428/116 X |
| 3,134,705 | 5/1964 | Moeller | 428/116 X |
| 3,140,516 | 7/1964 | Stack | 428/213 |
| 3,196,533 | 7/1965 | Ida et al. | 428/116 X |
| 3,218,217 | 11/1965 | Geschwender | 156/197 X |
| 3,257,253 | 6/1966 | Hoyt | 156/197 X |
| 3,356,555 | 12/1967 | Jackson | 156/205 |
| 3,366,525 | 1/1968 | Jackson | 428/116 X |
| 3,366,530 | 1/1968 | Kodich | 428/116 |
| 3,373,480 | 3/1968 | Fuchs, Jr. | 428/116 X |
| 3,428,515 | 2/1969 | Lorentzen | 428/117 |
| 3,547,727 | 12/1970 | Anderson | 428/116 X |
| 3,598,676 | 8/1971 | Noble | 428/116 X |
| 3,600,249 | 8/1971 | Jackson et al. | 428/116 X |
| 3,671,711 | 6/1972 | Cox et al. | 219/78.11 |
| 3,673,058 | 6/1972 | Jackson et al. | 428/118 |
| 3,819,439 | 6/1974 | Taylor | 428/116 X |
| 3,887,419 | 6/1975 | Geschwender | 156/197 |
| 3,933,020 | 1/1976 | Orr et al. | 29/455 LM |
| 3,936,920 | 2/1976 | Conn, Jr. | 228/181 X |
| 3,950,841 | 4/1976 | Conn | 228/125 |
| 3,991,245 | 11/1976 | Jackson | 428/116 |
| 4,020,207 | 4/1977 | Alfter et al. | 428/116 X |
| 4,043,498 | 8/1977 | Conn, Jr. | 228/265 |
| 4,174,987 | 11/1979 | Belvin et al. | 156/197 |
| 4,409,274 | 10/1983 | Chaplin et al. | 428/112 |
| 4,445,956 | 5/1984 | Freeman et al. | 428/147 X |
| 4,450,338 | 5/1984 | Conn, Jr. | 219/78.12 |
| 4,471,013 | 9/1984 | Welzen | 428/116 |
| 4,478,659 | 10/1984 | Hall | 156/197 X |
| 4,548,665 | 10/1985 | Morin | 156/197 |
| 4,548,778 | 10/1985 | Fujii | 264/180 |
| 4,569,884 | 2/1986 | Weinand et al. | 428/245 |
| 4,618,386 | 10/1986 | Yatsu et al. | 156/242 |
| 4,695,495 | 9/1987 | Ault | 428/73 |

FOREIGN PATENT DOCUMENTS

| | | |
|---|---|---|
| 738367 | 7/1966 | Canada . |
| 1078296 | 5/1980 | Canada . |
| 1629451 | 2/1971 | Fed. Rep. of Germany ...... 428/116 |
| 1130527 | 10/1968 | United Kingdom . |

Primary Examiner—Henry F. Epstein
Attorney, Agent, or Firm—Warner, Norcross & Judd

[57] ABSTRACT

The specification discloses a structural honeycomb core fabricated of crystalline theremoplastic to provide corrosion-resistant, heat-resistant, high-impact structure. The core includes inter-welded strips forming a rigid core. In a first embodiment, the linear strips are welded and then expanded to from a honeycomb core. In a second embodiment, the strips are corrugated prior to welding.

23 Claims, 2 Drawing Sheets

METHOD FOR MAKING WELDED HONEYCOMB CORE

BACKGROUND OF THE INVENTION

The present invention relates to structural panels incorporating honeycomb cores and more particularly to an improved core for such panels.

A wide variety of structural panels incorporating honeycomb cores have been developed, particularly for use as aircraft components. The panels typically include an open-cell honeycomb core having thin surface sheets bonded to opposite sides thereof The assembly results in a low-weight member capable of bearing large compression and shear forces.

The surface or face sheets are commonly made of metals or precured thermoset plastics reinforced with synthetic fibers. Typical sheet thicknesses are in the range 0.010 inch to 0.060 inch. Both face sheets are typically bonded to the core using thermosetting adhesives such as epoxies. The assembled core and face sheets are placed in a heated platen press or mold where the adhesive is allowed to cure under heat and pressure. Some thermosetting plastic face sheets are simultaneously cured and bonded to the core in a single operation without the need for adhesive. The uncured plastic resin of the face sheet liquifies initially when heated and wicks up and around the cell edges of the honeycomb which provides the fillets required to attach the face sheets to the core. The amount of pressure and temperature applied depends mainly on the cure characteristics of the resin and is typically in the range of 20 pounds per square inch (psi) to 200 psi and from 200 degrees Fahrenheit (F) to 600 degrees F.

Metal and thermoset plastic skins are easily damaged by impact and it is therefore desirable to use materials with much better impact resistance. Such materials are available in the thermoplastic resins; however, it is difficult to adhere the cores to the surfaces of these materials—especially the most chemical and heat resistant types such as polyphenylenesulfide (PPS) and polyetheretherketone (PEEK). Consequently, these materials have not gained acceptance for structural honeycomb panels.

The honeycomb cores are fabricated of metal, plastic, and/or paper. Further, the core can be of the "foil/film/sheet", "cast", "extruded", or "heat-formed" type.

Honeycomb fabrication of the "foil/film/sheet" type begins with the stacking of flat or corrugated sheets of web material on which parallel, evenly spaced, adhesive lines called "node lines" are rolled or printed on one or both faces. Cores made from these webs can be further divided into the "expandable" and "corrugated" types.

"Expandable" cores are typically made from flat sheets having node lines on only one side of each web. The sheets are placed on top of each other in such a way that the node lines of each consecutive layer will be positioned between two node lines on the layer below. The completed stack is heated and compressed until the node adhesive has cured and joined all layers. The resultant block is then sliced into smaller sections and expanded by pulling the outer-most sheets in directions generally perpendicular thereto. The sheets expand away from one another at areas between the node lines, and a hexagonal honeycomb structure is created.

The materials used in the expansion method include a wide variety of metallic foils, plastic films, paper sheets, and woven and non-woven fabrics of plastic, carbon, and glass fibers. Some cores, such as those made from fiberglass fabric and other fibrous materials, are subsequently dipped into water or solvent solutions of plastic resins in order to increase or enhance structural properties. However, the materials used in the fabrication of an expandable core must be capable of being adhesively bonded to one another. Further, relatively soft and thin-gauge materials must be used in order to facilitate expansion of the cured block, especially with limited adhesive strengths. The required expansion forces must not exceed the strength of the node adhesive or the individual layers of core material. As a further consideration, suitable materials tend to return to their relaxed state and must therefore be heated to their softening point and cooled while expanded so that the materials retain the desired hexagonal open-cell shape. The node adhesive must retain sufficient adhesive and cohesive properties to counteract the expansion forced at the required heat setting. This requirement limits the use of the expandable core to low temperature plastics with surfaces that permit bonding.

Expanded cores fabricated of metal are made mostly of thin aluminum foils of less than 0.006 inch thickness. The resultant cores are rather fragile and need to be handled very carefully prior to bonding. Damage to the unbonded cell walls causes the core to become prefailed, meaning that the core in the damaged area will not reach maximum strength levels. The thin foils are also very sensitive to corrosive environments, such as saltwater. Protective coatings are expensive and often of limited value.

Honeycomb cores made from thermosetting resins perform much better when exposed to corrosion. However, they are not impervious to vapor transmission and thus allow the entry of vapor into the honeycomb through the cell walls. Condensation of vapors is believed to cause the corrosion of adjoining aluminum face sheets within the laminated panels.

The "corrugated" process of honeycomb manufacture is normally used to produce products in the higher density range and to permit the use of materials that cannot be expanded as described above. In the corrugation process, a flat sheet or web is corrugated so that each sheet resembles half of the hexagon shape. Adhesive is then applied to the raised portions of the corrugated sheet; and the sheets are placed on top of each other so that all raised and coated corrugations come into contact with each other creating hexagonally shaped cells. The stacked block is then compressed and heated until the adhesive is cured to join the individual corrugated layers. The corrugated process is also used when cell shapes other than hexagons are desired, for example, to create bell-shaped cells.

The materials used in the corrugated process are typically of greater gauge and bending resistance than the materials used in the expansion process. Typical materials include stainless steel and materials with impregnating resins and binders such as fiberglass and paper. Alternatives to the adhesive joining of the corrugated sheets include spot-welding and solder-dipping, which are typically used with the stainless steel.

The corrugated process is not readily susceptible to automation since the light and often flexible materials used are difficult to support and align during the stacking process. The corrugated sheets tend to nest instead of resting on opposed raised portions. Further, only limited pressure can be used to compress the adhesive films during curing or the cell pattern of the stacked sheets will be distorted. This limited pressure also requires blocks made according to this method to be typically limited in dimension.

"Cast" honeycomb core is fabricated by either (1) pouring a solvent solution of a plastic into a mold resembling a honeycomb pattern or (2) injecting a melted or liquid resin into a mold. Both methods require the material to either dry, cool, or cure inside the mold which typically causes a certain amount of shrinkage. The solid honeycomb core is therefore difficult to unmold. Mold-release provisions are therefore necessary, such as release tapers along the surfaces parallel to the honeycomb cell wall. The resultant cores have tapered cell walls and are restricted to cell diameters sufficiently large to accommodate release tapers. Present typical "cast" cell diameters are at least approximately 0.5 inch.

"Extruded" honeycomb core is produced by forcing a melted plastic through an extrusion die orifice which resembles either a single honeycomb cell or multiple honeycomb cells. The extrusions are cooled, cut to the desired length, stacked, and either adhesively bonded to each other or fused by solvent cementing. The process requires plastic materials that can be either dissolved by solvents or adhered using adhesives with little bonding pressure and/or heat. The extruded materials cannot be easily modified to include fiber reinforcements into the melt stream exiting the extrusion die. The resultant cores are therefore not as strong as those created using the expanded and corrugated techniques.

The "heat-formed" honeycomb cores resemble the typical hexagonal honeycomb core structure the least. According to this method, a thermoformable plastic sheet is heated to its forming temperature and then formed into a honeycomb-like shape by simultaneously stretching the sheet in opposite directions perpendicular to its initial plane. The stretching tools are either chilled metal pins extending through the sheet or perforated platens which are adhered to the plastic sheet and pull it apart. The heat-formed method results in cores with cell walls which are not perpendicular to the cell opening and which have varying cell-wall thicknesses. These cores therefore provide only low structural properties.

SUMMARY OF THE INVENTION

The aforementioned problems are overcome in the present invention providing a honeycomb core which is corrosion-resistant, impact-resistant, and heat-resistant. The core is fabricated from thermoplastic resins without the use of thermosetting adhesives. The core structure and method of its fabrication enable the plastic to be reinforced with synthetic, glass, or carbon fibers. More specifically, the core is fabricated from thermoplastic sheets using either the corrugated or expanded process with the core nodes being welded or otherwise melted together. The presently preferred crystalline thermoplastics of which the present core is fabricated are generally well known to those having ordinary skill in the thermoplastic art. Applicant has recognized that such materials provide the desired characteristics for honeycomb panels and honeycomb cores. For example, thermoplastic cores could be melted to thermoplastic face sheets without the use of adhesive.

However, several problems, the solutions of which are incorporated into the present invention, had to be addressed prior to the use of these new materials. First, bond strength using thermosetting adhesives in conjunction with crystalline thermoplastics is insufficient to allow subsequent expansion of the cores at elevated temperatures required to set the core in a rigid configuration. Second, crystalline thermoplastics cannot readily be put into solution for casting and/or solvent cementing. Third, attempts to fabricate honeycomb cores with thermoplastic materials using the cast, extruded, or heat-formed methods preclude the convenient use of fibrous reinforcement which is required to obtain higher structural properties.

After all conventional technologies for interbonding the crystalline thermoplastics proved unsuccessful, Applicant conceived that such sheets could be intersecured by welding or otherwise melting the sheets to one another. Welding or melting eliminates the use of thermosetting adhesives, solvents, and other chemical bonding agents.

According to the present invention, the thermoplastic sheets are welded together at spaced locations while the material is either in a flat or corrugated shape. Most desirably, each sheet or strip is laid in position on the stack and welded at spaced locations to the previous sheet. This process of laying a new sheet in place and welding it at spaced locations to the previous sheet continuous until a stack of the desired thickness or number of layers is created. The stack is then heated to the softening temperature of the material and expanded in conventional fashion to create the honeycomb configuration. Cooling to a lower temperature allows the expanded core to rigidify.

The resultant core is less expensive than most metallic cores and is also corrosion, chemical, and impact-resistant. Electrical properties are uniform since only one type of material is used in the assembly.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
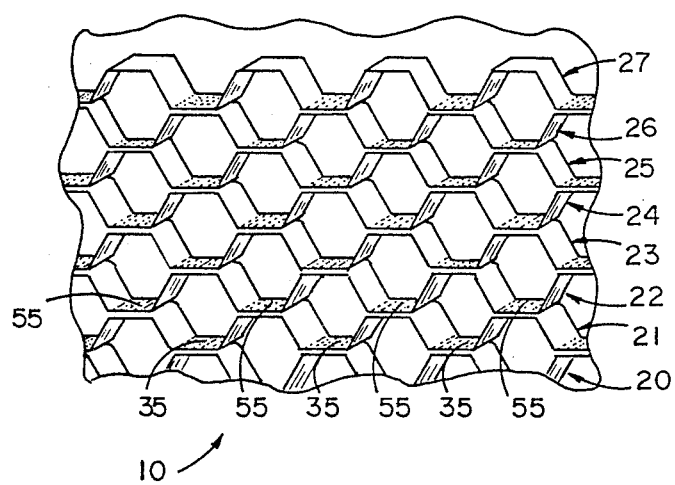
FIG. 1 is a fragmentary perspective view of the structural honeycomb core fabricated in accordance with the present invention.

A structural honeycomb core constructed in accordance with a preferred embodiment of the invention is illustrated in FIG. 1 and generally designated 10. The core includes a plurality of layers 20-27 which are selectively bonded at nodes 35 and expanded to define a plurality of adjacent hexagonal cells. The appearance of the honeycomb core of the present invention is similar to the appearance of honeycomb cores generally well known in the art.

The material of which the core 10 is fabricated is a thermoplastic, such materials being generally well known to those having ordinary skill in the thermoplastic art. Suitable materials can be amorphous or crystalline and can be reinforced with fibrous materials and fillers of metal, glass, carbon, ceramic, or other plastics. The thermoplastic presently preferred is a crystalline thermoplastic sold under the trademark VICTREX PEEK by ICI Americas of Dover, Del. and filled with a woven fiberglass fabric such as style 106 commonly available. Other suitable materials, reinforcements, and fillers will become apparent to those having ordinary skill in the thermoplastic art based upon the described manufacturing process. Generally speaking, any thermoplastic with or without reinforcement and/or filler may be used as long as sheets made from these materials can be fused to themselves at or near the melt temperature of the thermoplastic resin that encapsulates all other reinforcements and fillers.

The core of the present invention is fabricated basically in four phases. The first phase is the preparation of the sheet material for subsequent welding by means of corrugation, surface treatment, or deposition of metallic micron-sized particles at the intended node lines. All or none of these steps may be required, depending on whether corrugated or flat sheets are to be used and also depending upon the source of fusion heat to be selected. The second phase consists of the laying up of layers and welding the various layers together at selected spaced nodes. The third phase comprises heating the stack of sheets to the softening temperature of the thermoplastic. The fourth step includes expanding the heated stack and then cooling the stack to allow the resultant honeycomb structure to rigidify. Phases three and four are not required when precorrugated sheets are used.

Figure 2:
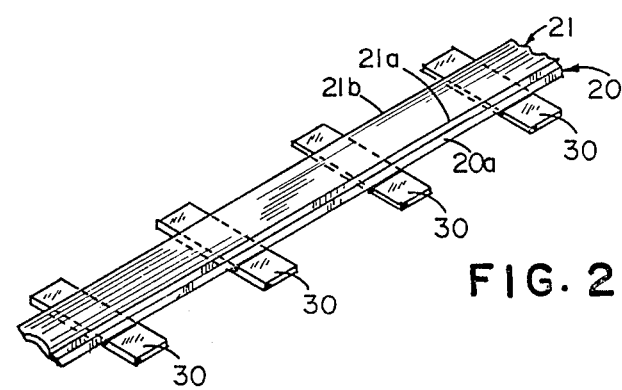
FIGS. 2-8 illustrate the core at various stages of its manufacturing during the laying up and welding steps.
Figure 3:
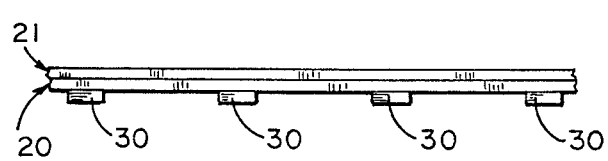

FIGS. 2 and 3 illustrate the initial laying up step in beginning manufacture of a core. Two thermoplastic sheets 20 and 21 are superimposed or laid on one another throughout their length. As illustrated, the ends of each strip are broken to show indeterminate length. The length of the strips is not important to the present invention. The bottom strip 20 includes a pair of lateral edges 20a and 20b (not visible), and likewise the top strip 21 has a pair of lateral edges 21a and 21b. When the strips are superimposed on one another, the lateral edges 20a and 21a and also 20b and 21b are aligned so that the resultant expanded core will have a relatively flat or uniform surface. A plurality of foil strips 30, or other release substrates, are provided at spaced locations under the bottom strip 20. Each foil strip 30 is at least as long as, and preferably longer than, the width of the strips 20 and 21 so that the foil strip extends from either side thereof. Further, the width of each release substrate 30 is at least approximately ¼ of the center-to-center distance between adjacent foils. This spacing is conventional to create an expanded core having regularly shaped hexagonal cells.

Figure 4:
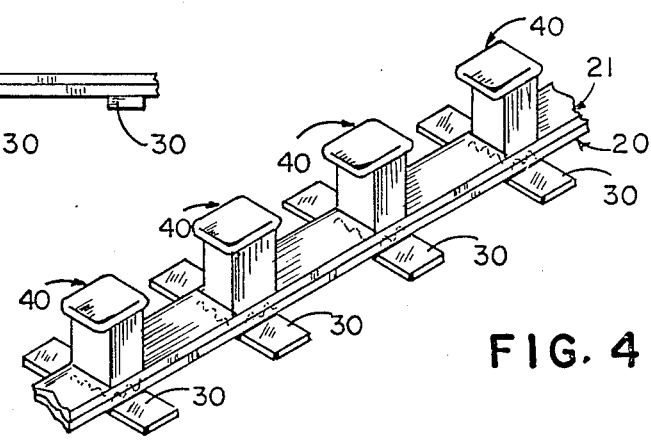
Figure 5:
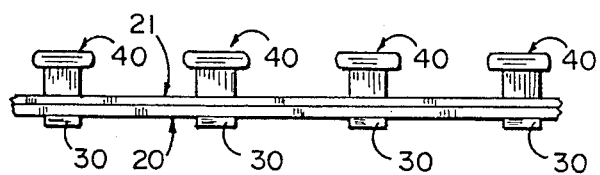

FIGS. 4 and 5 illustrate the first welding step in the fabrication of the core. The strips 20 and 21 are welded together at evenly spaced locations or nodes above the foil strips 30. A plurality of uniformly spaced ultrasonic welding heads 40 are brought down into contact with the top strip 21 so that each head is generally aligned with one of the foil strips 30. Ultrasonic welders are generally well known to those having ordinary skill in the ultrasonic welding art and consequently the apparatus on which welding heads 40 are mounted will not be described. Suffice it to say that the welding heads 40 are each capable of providing an ultrasonic weld to the strips 20 and 21 when positioned thereagainst. Preferably, the width of each weld is ¼ of the center-to-center distance between welding heads—such dimensions being conventional to create regular hexagonal cells.

At least three types of known welding head configurations can be used in performing the welding steps. As presently preferred, ultrasonic welding is used wherein the welding horns heat the material through high-frequency vertically reciprocating motion. An alternate welding technology includes the deposition of metallic ferrous particles on the node lines; and incorporating induction coils within the welding heads to cause the metallic particles and material to be heated through the action of a magnetic field. Such induction welders are sold by Hellerbond Technology of Columbus, Ohio and EMA Bond Inc. of Englewood, N.J. As a third alternative, an electrically heated welding head can be used to transfer heat to the plastic material.

Figure 6:
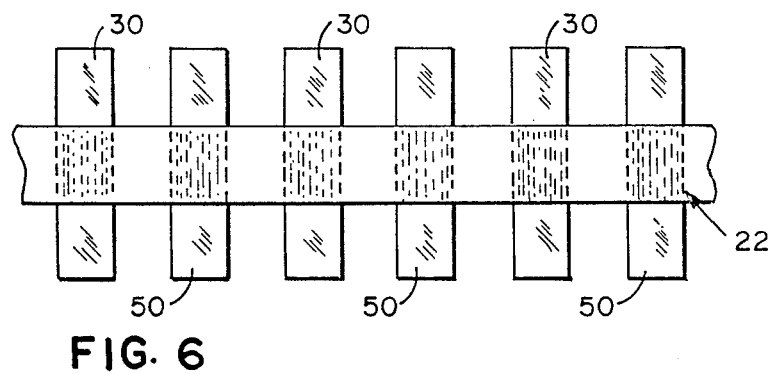
Figure 7:
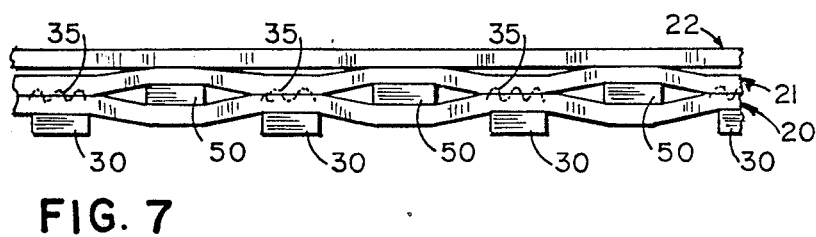

After the first welding operation between strips 20 and 21 is complete, the welding heads are withdrawn and an additional strip 22 is laid in position as illustrated in FIGS. 6 and 7. As with all the strips, the lateral edges of the strip 22 are aligned with the lateral edges of the strips 20 and 21. Additionally, foil strips or other release substrates 50 are inserted between strips 20 and 21 at spaced locations between welded nodes 35. The foil strips 50 are generally identical to the foil strips 30. Consequently, the width of each of the foil strips 50 is approximately ¼ of the center-to-center distance between foil strips 30 or the center-to-center distance between the foil strips 50. Further, each foil strip 50 is approximately midway between two foil strips 30 of the previous layer.

After the strip 22 is placed in position, the welding heads 40 are brought down into engagement with the strip 22 at evenly spaced locations above and aligned with the release strips 50. The welder is then actuated to create an ultrasonic weld at nodes 55, each of which has a width generally ¼ of the center-to-center distance between the welding heads. As noted above, the welding heads 40 are preferably fixedly spaced from one another in an appropriate supporting structure. The same welding heads can be used to weld alternating node layers 35 and 55 by alternately shifting the weld heads back and forth ½ of the center-to-center distance between the heads for each layer.

Figure 8:
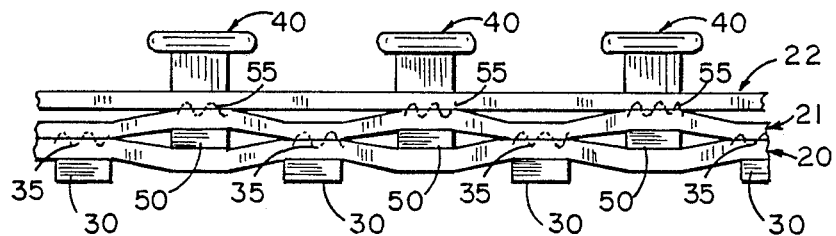

As illustrated in FIG. 8, each strip such as 21 is welded to each of the adjacent strips 20 and 22. The foil release strips 30 and 40 insure that only two adjacent layers or strips will be joined together during each welding operation. The weld nodes 35 between the strips 20 and 21 alternate along the length of the strips with the weld nodes 55 between the strips 21 and 22. Consequently, the length of each strip 21 is approximately ½ occupied by weld nodes 35 and 5 and ½ free.

The sequence illustrated in FIGS. 6–8 of placing another crystalline thermoplastic strip in position, inserting release substrates, and welding the new strip at spaced locations is repeated until a stack having the desired thickness or number of layers is created. Typically, the release strips 30 and 50 are withdrawn from the assembly after all welding is complete. Alternately, the release strips can be removed when the stack has increased in size so that no danger of ultrasonic bonding is created at the layers from which the release strips are removed. Perhaps the easiest means of removing the release strips is permitting them to fall from between the cells as the honeycomb core is expanded.

After all welds are complete, the assembly is expanded to create the regularly shaped hexagonal open cells seen in FIG. 1. It is conceivable that one portion of the web could be expanded while a separate portion of the web is still being supplemented with additional thermoplastic strips.

After expansion is complete, the expanded core may be treated to rigidify the crystalline thermoplastic strips. Depending on the material used for the strips 20 through 27, other rigidifying processes may be used. For example, it may be desirable to chemically treat the strips to create rigidity or to dip-coat the expanded core in a material which subsequently rigidifies as a coating.

The core described above can then be used in fabricating structural panels in conventional fashion. Specifically, surfacing sheets or layers (not shown) are applied to the two opposite sides of the honeycomb core structure to create a panel. The panel face sheets, if made of the same material as the core, or if fusable to the core material, could be melted to the core as well without the use of epoxies or other adhesive or bonding agents.

Figure 9:
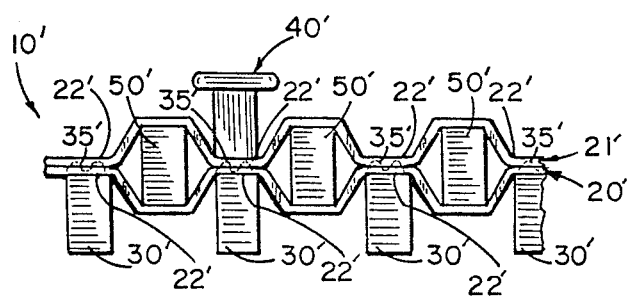
FIG. 9 illustrates how the welding process can be adapted to the laying up of corrugated sheets.

FIG. 9 illustrates the use of the present invention in fabricating corrugated cores 10'. In contrast to the layers 20 and 21 described above, the layers 20' and 21' are corrugated prior to welding. The raised areas 22' of adjacent sheets are aligned with one another and welded together using welding techniques as described above. The release substrates 50' are as high (as viewed in FIG. 9) as one of the cells and are as wide as one of the cell walls to facilitate stacking and maintain cell shape during welding.

The described core enables the fabrication of structural panels which are particularly well suited to high-temperature applications. The crystalline thermoplastic is relatively inexpensive as compared to metallic cores which have been previously required in hightemperature applications. Further, the described material is noncorrosive and impact-resistant.

It is also anticipated that various layers of the core could be fabricated of different thermoplastics, as long as the different thermoplastics fused to each other. For example, it may be desirable to use different materials to improve electrical characteristics. For example, a core could be fabricated of alternate layers of polyetherimide (PEI) resin sold under the trademark ULTEM by General Electric Company with alternate layers being fabricated of polyethersulsone (PES) resin sold under the trademark VICTREX PES by ICI Americas of Dover, Del.

The above description are those of preferred embodiments of the invention. Various alterations and changes can be made without departing from the spirit and broader aspects of the invention, which are to be interpreted in accordance with the principles of patent law including the doctrine of equivalents.

The embodiments of the invention in which an exclusive property of privilege is claimed are defined as follows:

1. A method of fabricating a structural honeycomb core comprising:
    superimposing first and second strips of thermoplastic with the opposite lateral edges of each aligned;
    placing release substrates at first spaced locations along the length of the superimposed strips on the side of the first strip opposite the second strip;
    welding the superimposed strips to one another at the first spaced locations;
    superimposing a third strip of thermoplastic over the second strip with the lateral edges of each aligned after the welding of the first and second strips;
    placing release substrates between the second and first strips at second spaced locations between the first spaced locations;
    welding the superimposed third and second strips to one another at the second spaced locations; and
    expanding the welded strips to form a honeycomb structure.

2. A method of fabricating a structural honeycomb core as defined in claim 1 further comprising repeating said superimposing steps, said placing steps, and said welding steps repeatedly to create a multiplicity of welded layers of the strips.

3. A method of fabricating a structural honeycomb core as defined in claim 1 wherein the thermoplastic is crystalline thermoplastic.

4. A method of fabricating a structural honeycomb core as defined in claim 3 wherein the crystalline thermoplastic is fiber reinforced.

5. A method of fabricating a structural honeycomb core comprising:
    stacking a plurality of thermoplastic strips one upon the other;
    stacking release substrate members adjacent each pair of adjacent strips at spaced locations such that a row of release substrate members are positioned below each pair of stacked strips;
    welding each stacked strip to its adjacent previously stacked strip at spaced weldment locations before the next said strip is stacked, the spaced weldment locations being defined for each pair of strips by the release substrate members positioned directly below said each pair of strips, the spaced weldment locations securing each pair of strips together being offset from the spaced weldment locations securing one of said strips of each said pair of strips to another strip, said inserted release substrates preventing any one weld from joining more than two of the strips together.

6. A method of fabricating a structural honeycomb core as defined in claim 5 wherein the strips are fabricated of a thermoplastic material, and further comprising the steps of:
    expanding the welded strips as necessary to form a honeycomb configuration;
    heating the strips to their softening temperature; and
    cooling the strips while held in the expanded position to rigidify the strips in the honeycomb configuration.

7. A method of fabricating a structural honeycomb core as defined in claim 5 wherein the strips are corrugated prior to said stacking step.

8. A method of fabricating a structural honeycomb core as defined in claim 5 wherein said material is a crystalline thermoplastic.

9. A method of fabricating a structural honeycomb core as defined in claim 5 wherein said step of inserting release substrate members further includes inserting a row of release substrate members between each pair of adjacent strips such that said spaced locations of release substrate members in each row are offset from said spaced locations of release substrate members in each row adjacent thereto.

10. A method of fabricating a structural honeycomb core comprising:
    sequentially stacking a plurality of generally linear thermoplastic strips one upon the other;
    sequentially stacking release substrates at spaced locations with said strips;
    sequentially welding adjacent strips at spaced locations such that an additional pair of strips are welded together after each additional strip is stacked; and expanding the generally linear strips after completion of the welding such that adjacent strips form an open cell between each welded location.

11. A method of fabricating a structural honeycomb core as defined in claim 10 further comprising sequentially placing a row of release substrates below each two adjacent strips at said spaced locations such that an additional row of release substrates is placed at said spaced locations after each additional strip is stacked to define an additional pair of strips to be welded together.

12. A method of fabricating a structural honeycomb core as defined in claim 11 wherein said release substrates are frictionally held in place between said strips in an unbonded relationship.

13. A method of fabricating a structural honeycomb core as defined in claim 12 wherein each said strip engaged by a pair of adjacent strips is welded to said adjacent strips such that the welded locations securing each such strip to one of said adjacent strips is offset from the welded locations securing each such strip to the other of said adjacent strips.

14. A method of fabricating a structural honeycomb core comprising:
    superimposing first and second strips of thermoplastic;
    placing release substrates at first spaced locations along the length of the superimposed strips on the side of the first strip opposite the second strip;
    welding the superimposed strips to one another at the first spaced locations;
    superimposing a third strip of thermoplastic over the second strip after said welding of the first and second strips;
    placing release substrates between said first and second strips at second spaced locations between the first spaced locations; and
    welding the superimposed second and third strips to one another at the second spaced locations.

15. A method of fabricating a structural honeycomb core as defined in claim 14 further comprising repeating said superimposing steps, said placing steps and said welding steps repeatedly to create a multiplicity of welded layers of the strips.

16. A method of fabricating a structural honeycomb core comprising:
    stacking a plurality of thermoplastic strips one upon another;
    inserting release substrates beneath each pair of adjacent strips at the spaced locations, each said release substrate being unbonded to any of said strips;
    individually welding each pair of adjacent strips at the spaced locations above the release substrates positioned beneath the particular pair of strips such that each pair of strips is welded together before the next adjacent strip is stacked, said release substrates preventing any one weld from joining more than two of said strips together.

17. A method of fabricating a structural honeycomb core as defined in claim 16 further comprising expanding the welded strips such that an open cell is defined between each welded location by each pair of adjacent strips.

18. A method of fabricating a structural honeycomb core as defined in claim 16 wherein said release substrates are released from their positions between said strips and removed when said strips are expanded.

19. A method of fabricating a structural honeycomb core as defined in claim 11 wherein said provided release substrates engage said strips only along portions of the strips which are welded together.

20. A method of fabricating a structural honeycomb core as defined in claim 14 wherein said provided release substrates engage said strips only along portions of the strips which are welded together.

21. A method of fabricating a structural honeycomb core as defined in claim 16 wherein said provided release substrates engage said strips only along portions of the strips which are welded together.

22. (amended) A method of fabricating a honeycomb core comprising:
    stacking a plurality of corrugated strips one upon the other, each said strip including spaced apart nodes defined by planar segments, said strips being stacked such that said nodes of each pair of adjacent strips are engaged with one another;
    placing a plurality of release substrates each having a pair of end faces beneath each pair of adjacent strips such that said end faces of said release substrates engage only said nodes of said strips to prevent more than two strips from bonding together with any one weld and to hold said strips in their proper positions prior to welding; and
    welding each pair of adjacent strips together along said nodes to form a honeycomb structure after each said strip is stacked.

23. A method of fabricating a honeycomb core as defined in claim 22 wherein each said stacked strip includes interconnecting segments which interconnect said nodes and define therewith said corrugated configuration, wherein each said interconnecting segment is oriented at an obtuse angle with respect to each said node which it interconnects to define corners in said strip, and wherein said provided release substrates are received within said corners to hold said strips in their proper positions.

* * * * *

UNITED STATES PATENT AND TRADEMARK OFFICE
CERTIFICATE OF CORRECTION

PATENT NO. : 4,957,577

DATED : September 18, 1990

INVENTOR(S) : Fritz Huebner

It is certified that error appears in the above-identified patent and that said Letters Patent is hereby corrected as shown below:

Title page:

Abstract, Line 6:

"from" should be --form--.

Claim 22, Column 10, Line 27:

delete "(amended)".

Signed and Sealed this

Twenty-first Day of January, 1992

*Attest:*

HARRY F. MANBECK, JR.

*Attesting Officer*      *Commissioner of Patents and Trademarks*